(12) United States Patent
Kobayashi

(10) Patent No.: US 7,362,434 B2
(45) Date of Patent: Apr. 22, 2008

(54) OPTICAL SWITCH

(75) Inventor: Shohei Kobayashi, Hino (JP)

(73) Assignee: Olympus Corporation, Tokyo (JP)

( * ) Notice: Subject to any disclaimer, the term of this patent is extended or adjusted under 35 U.S.C. 154(b) by 167 days.

(21) Appl. No.: 11/258,449

(22) Filed: Oct. 25, 2005

(65) Prior Publication Data
US 2006/0098196 A1  May 11, 2006

(30) Foreign Application Priority Data
Nov. 9, 2004  (JP)  ............... 2004-324625

(51) Int. Cl.
*G01J 3/28* (2006.01)
(52) U.S. Cl. ............ 356/326; 356/328; 359/290; 385/15
(58) Field of Classification Search ........ 356/326, 356/328; 385/37, 16, 17, 18, 15; 359/290
See application file for complete search history.

(56) References Cited

U.S. PATENT DOCUMENTS 6,657,770 B2 * 12/2003 Marom et al. ............ 359/290
6,738,540 B2   5/2004  Marom 2002/0071627 A1 * 6/2002 Smith et al. ............ 385/15
2003/0002791 A1 * 1/2003 Cao ..................... 385/37

FOREIGN PATENT DOCUMENTS

JP      2003-101479      4/2003

* cited by examiner

*Primary Examiner*—F. L. Evans
*Assistant Examiner*—Abdullahi Nur
(74) *Attorney, Agent, or Firm*—Scully, Scott, Murphy & Presser, P.C.

(57) ABSTRACT

A highly reliable optical switch which can output (switch) accurately to an optical fiber for output without being affected by a change in an environment and a change due to an elapsed time is provided. The optical switch includes a first spectroscope which separates spatially light from an optical fiber for input according to a wavelength and a mirror array which includes a plurality of mirrors which reflect separated light and an angle of each of the mirrors can be controlled independently by an electric signal. The optical switch further includes An optical branching device which extracts a part of an output light from the optical fiber for output, an optical fiber for monitoring which guides apart of output light extracted by the optical branching device, a second spectroscope which separates spatially light from the optical fiber for monitoring according to a wavelength, and a photodetector array which can detect lights of different wavelengths separated at the second spectroscope.

7 Claims, 8 Drawing Sheets

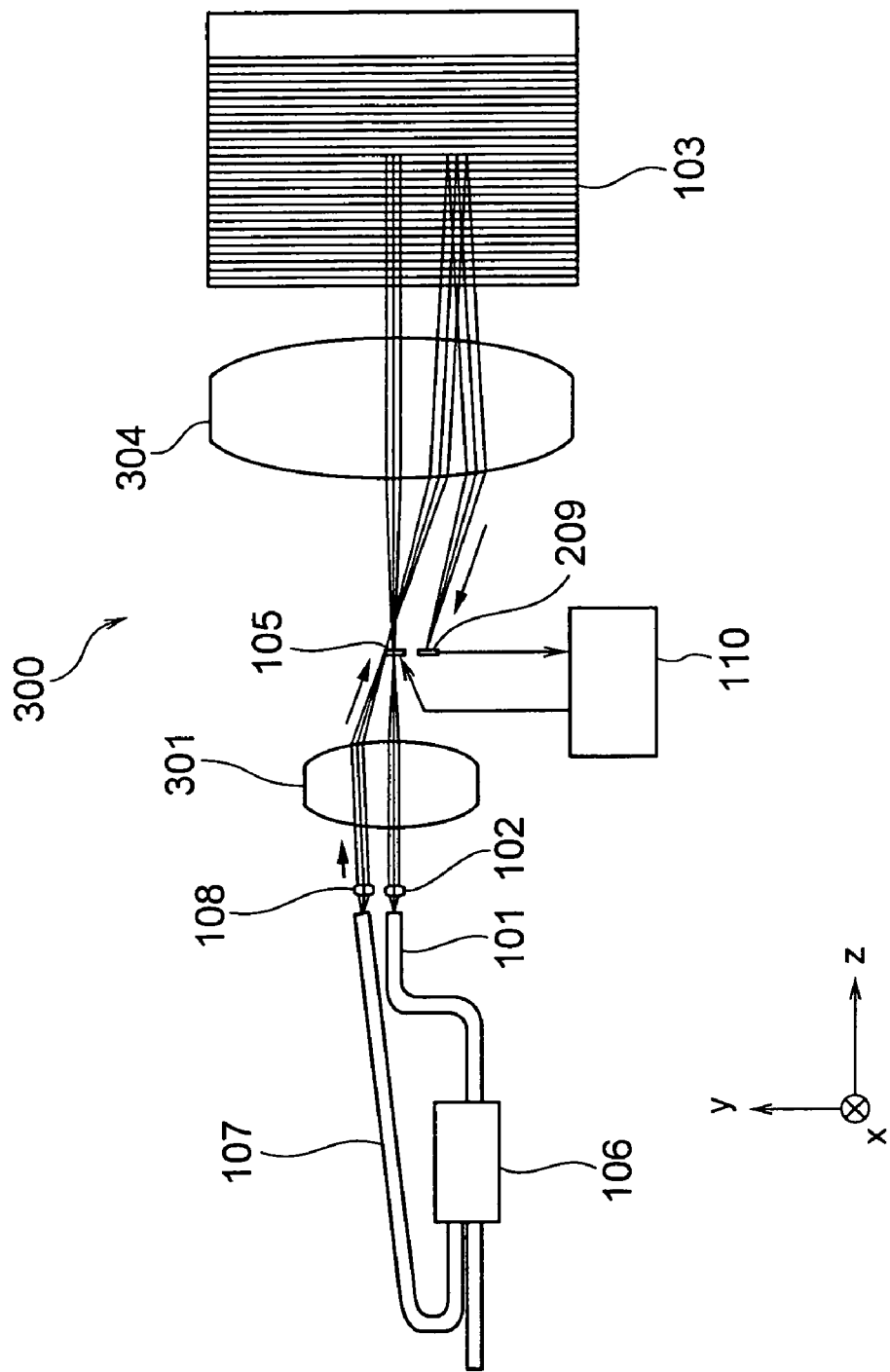

OPTICAL SWITCH

CROSS-REFERENCE TO RELATED APPLICATION

The present application is based upon and claims the benefit of priority from the prior Japanese Patent Application No. 2004-324625 filed on Nov. 9, 2004; the entire contents of which are incorporated herein by reference.

BACKGROUND OF THE INVENTION

1. Field of the Invention

The present invention relates to an optical switch, and in particular to an optical switch that separates light according to a wavelength.

2. Description of the Related Art

In recent years, a technology for transmitting by multiplexing optical signals of different wavelengths in one optical fiber has been used practically. For example, a structure in which a plurality of signals that have been multiplexed are separated for each optical signal of different wavelength and then switched by using a mirror has been disclosed in Japanese Patent Application Laid-open Publication No. 2003-101479. In the structure disclosed in the Japanese Patent Application Laid-open Publication No. 2003-101479, to start with, light emitted from an input port, which is an optical fiber for input, is converted into parallel light by a micro lens array which is a collimating lens. The parallel light is reflected by a diffraction grating for spectrum. The light reflected passes through a second lens which is an image forming lens. By this, the light emitted from the input port is separated spatially for different wavelength. The light separated spatially is incident on different mirrors in a mirror array according to the wavelength. The mirror array includes a plurality of mirrors for which an angle of a reflecting surface can be controlled independently. The light incident on the mirror is reflected upon deflection according to an angle of the mirror. The reflected light again passes through the second lens and is incident on the diffraction grating. The light reflected by the diffraction grating is incident on an output port which is an optical fiber for output. The optical signal is output (switched) to a desired optical fiber for output by changing the angle of the mirror.

However, the angle of the mirror sometimes differs from a predetermined angle due to an effect of a change in an environment such as temperature and humidity, and a change due to an elapsed time. If the angle of the mirror differs from the predetermined angle, light emitted from the optical fiber for input cannot be allowed to be incident accurately on the desired optical fiber for output. In such case, it is not possible to ascertain whether the light from the optical fiber for input is output (switched) accurately on the optical fiber for output or not. For this reason there is an increase in a loss of the output signal. Moreover, if a part of light is incident on an optical fiber for output other than the desired optical fiber for output, there is a possibility of a cross talk.

SUMMARY OF THE INVENTION

The present invention is made in view of the problems mentioned above, and it is an object of the present invention to provide a highly reliable optical switch which can output (switch) accurately to the optical fiber for output without being affected by a change in an environment and a change due to an elapsed time.

To solve the problems mentioned above and to achieve the object, according to the present invention, it is possible to provide an optical switch that includes an optical fiber for input, an optical fiber for output, a plurality of collimating lens which are disposed corresponding to the optical fiber for input and the optical fiber for output, a first spectroscope which separates spatially the light from the collimating lens, a first image forming lens which forms the light from the first spectroscope as an image, and a mirror array which includes a plurality of mirrors which reflects the light that is formed as an image by the first image forming lens and the angle of each mirror can be controlled independently by an electric signal. This optical switch is characterized by including an optical branching device which is connected to the optical fiber for output and extracts a part of the output light from the optical fiber for output, an optical fiber for monitoring which guides a part of the output light extracted by the optical branching device, a collimating lens for monitoring which is disposed corresponding to the optical fiber for monitoring, a second spectroscope which separates spatially light from the collimating lens for monitoring according to a wavelength, and a photodetector array which can detect each light of different wavelength separated at the second spectroscope.

Moreover, according to one aspect of the present invention, it is desirable that the first spectroscope and the second spectroscope are one and the same spectroscope.

According to another aspect of the present invention, it is desirable that a second image forming lens is provided between the second spectroscope and the photodetector array.

According to still another aspect of the present invention, it is desirable that the first image forming lens and the second image forming lens are one and the same image forming lens and an end face of the optical fiber for monitoring and an end face of the optical fiber for input are inclined with respect to each other so that an optical axis of light emitted towards the second spectroscope from the optical fiber for monitoring and an optical axis of light emitted towards the first spectroscope from the optical fiber for input are not parallel.

According to still another aspect of the present invention, it is desirable that the mirror array and the photodetector array are disposed on the same plane which is an image forming surface of the image forming lens.

According to still another aspect of the present invention, it is desirable to have an electric control circuit which controls an angle of a mirror which reflects light of detected wavelength so that an intensity of light of the detected wavelength of at least one photodetector in the photodetector array becomes constant.

According to still another aspect of the present invention, it is desirable to have an electric control circuit which controls an angle of a mirror which reflects light of detected wavelength so that an intensity of light of the detected wavelength of at least one photodetector in the photodetector array becomes the maximum.

According to still another aspect of the present invention, it is desirable to have a demodulator circuit which demodulates an optical signal which is detected by at least one photodetector in the photodetector array, to an electric signal.

To solve the problems mentioned above and to achieve the object, according to the present invention, it is possible to provide an optical switch that includes an optical fiber for input, an optical fiber for output, a collimating lens which is disposed corresponding to the optical fiber for input and the optical fiber for output, a first spectroscope which separates spatially the light from the collimating lens, a first image forming lens which forms the light from the first spectroscope as an image, and a mirror array which includes a plurality of mirrors which reflects the light that is formed as an image by the first image forming lens and the angle of each mirror can be controlled independently by an electric signal. This optical switch is characterized by including an optical branching device which is connected to the optical fiber for output and extracts a part of the output light from the optical fiber for output, an optical fiber for monitoring which guides a part of the output light extracted by the optical branching device, a second spectroscope which separates spatially light from the collimating lens according to a wavelength, and a photodetector array which can detect each light of different wavelength separated at the second spectroscope.

In the present invention, the optical switch is structured such that light of a predetermined wavelength from light separated spatially at the first spectroscope is incident on a desired optical fiber for output by controlling the angle of the mirror. An optical branching device splits a part of the light from the optical fiber for output and extracts it. The light split is separated further spatially according to a wavelength at the second spectroscope. The photodetector array detects the light separated. A detection result of the photodetector array corresponds to an intensity of light of a predetermined wavelength from among lights propagated inside the optical fiber for output. In this case, the angle of the mirror is controlled such that a resultant output from the photodetector array is a predetermined value. Thus, in the present invention, the angle of the mirror can be controlled based on the detection result of the photodetector array. By this, light emitted from the optical fiber for input can be output (switched) accurately to the optical fiber for output. Therefore, it is possible to reduce a loss of an output signal. Moreover, it is possible to allow a light to be incident on a desired optical fiber for output. Therefore, it is possible to reduce across talk. Thus, according to the present invention, it is possible to provide a highly reliable optical switch which enables to output (switch) accurately to the optical fiber for output.

BRIEF DESCRIPTION OF THE DRAWINGS

FIG. 4 is a diagram denoting a side structure of the optical switch according to the third embodiment;

DETAILED DESCRIPTION OF THE PREFERRED EMBODIMENTS

Exemplary embodiments of an optical switch according to the present invention will be described below in detail with reference to the accompanying diagrams. However, the present invention is not restricted to these embodiments.

First Embodiment

Figure 1:
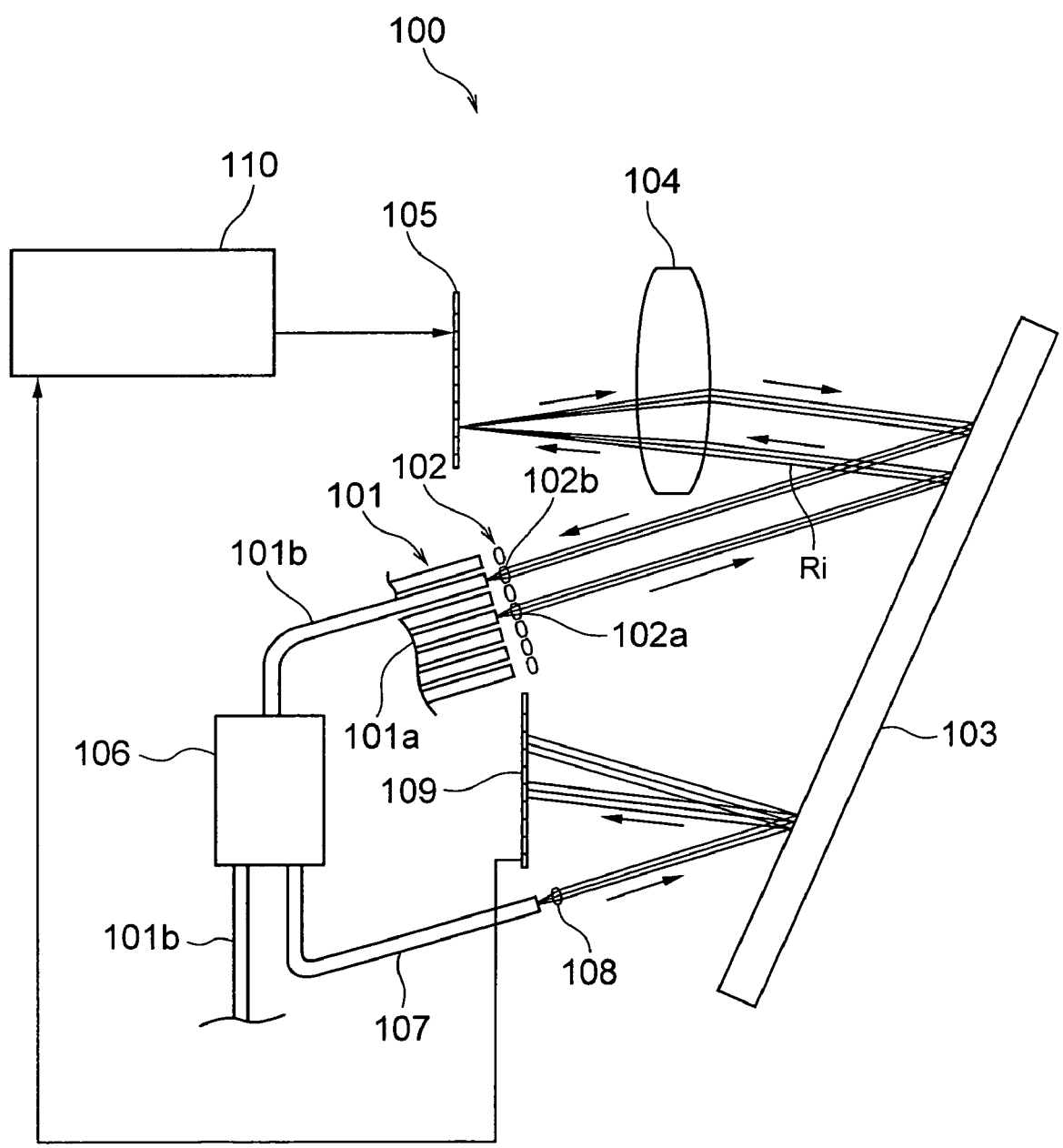
FIG. 1 is a diagram denoting a schematic structure of an optical switch according to a first embodiment.

FIG. 1 is a diagram denoting a schematic structure of an optical switch 100 according to a first embodiment of the present invention. An optical fiber 101 includes a plurality of fibers which include an optical fiber 101a for input and an optical fiber 101b for output. A collimating lens 102 is disposed near an end face of the optical fiber 101. The collimating lens 102 includes a plurality of collimating lenses each corresponding to each of the optical fibers. Light emitted from the optical fiber 101a for input is incident on a corresponding collimating lens 102a. The collimating lens 102a converts the incident light into parallel light and allows the parallel light to emit. The light emitted from the collimating lens 102a is incident on a grating 103. The grating 103 is a reflecting diffraction grating. The grating 103 corresponds to a first spectroscope. An angle of diffraction of light diffracted at the grating 103 differs according a wavelength. Therefore, light emitted from the optical fiber 101a for input is separated spatially according to a wavelength by the grating 103. Here, a case of multiplexing N number of lights of different wavelength which have emitted from the optical fiber 101a for input is taken into consideration. In this case, the light diffracted from the grating 103 is separated into N number of lights of different angles. In FIG. 1, for the sake of expediency, only an ith light Ri (having wavelength $\lambda_i$) among the N number of lights is indicated and the lights of other wavelengths are not shown in the diagram.

The light diffracted at the grating 103 forms an image on a mirror array 105 by a first image forming lens 104. The mirror array 105 includes a plurality of mirrors arranged in a row. At this time, the lights of different wavelengths are diffracted at different angles by the grating 103. Therefore, the lights of different wavelengths form an image on different mirrors of the mirror array 105. The light Ri of wavelength $\lambda_i$ forms an image on ith mirror from among the plurality of mirrors in the mirror array 105. An angle of each mirror in the mirror array 105 is controlled independently by an electric signal from an electric control circuit 110. The light Ri of wavelength $\lambda_i$ is reflected by the ith mirror whose angle is controlled such that the light Ri is incident on the optical fiber 101b for output. Light reflected from the mirror array 105 again passes through the first image forming lens 104. Next, the reflected light is diffracted at the grating 103. The reflected light which is diffracted is incident on a collimating lens 102b. The collimating lens 102b is provided at a position corresponding to the optical fiber 101b for output. The collimating lens 102b converges the light incident on an end face of the optical fiber 101b for output. Then the light converged is incident on the optical fiber 101b.

A structure of the plurality of optical fibers 101 will be described below in detail. The optical fiber 101a for input need not be necessarily only one and there may be a plurality of the optical fibers. Similarly, the optical fiber 101b for output need not be necessarily only one and there may be a plurality of optical fibers. Optical fibers other than the optical fibers for input can be used as the optical fibers for output. Moreover, in FIG. 1, by reversing a direction of light it is possible to allow the light to pass from the optical fiber 101b for output to the optical fiber 101a for input. In other words, it is also possible to interchange a function for input and a function for output of the optical fiber for input and the optical fiber for output respectively.

By changing the angle of the ith mirror in the mirror array 105, it is also possible to allow the light of wavelength λ to reflect towards another optical fiber for output which is different from the optical fiber 101b for output. Thus, it is possible to change over the optical fiber for output to which the light of wavelength $\lambda_i$ is output.

It is not shown in the diagram, however, light in a wavelength range having a wavelength different from $\lambda_i$, such as jth (not ith) light (let the wavelength be $\lambda_j$) among the N number of lights forms an image in a jth mirror in the mirror array 105. By an electric signal from the electric control circuit 110, an angle of the jth mirror is controlled. For this reason, the light of wavelength $\lambda_j$ is reflected by the jth mirror towards any one optical fiber from among the optical fibers for output which include the optical fiber 101b.

An optical fiber other than the optical fiber 101a can also be used as an optical fiber for input. In this case, a movement of light such as behavior of light is similar to a movement in a case of the optical fiber 101a mentioned above. Thus, any of the optical fibers 101 can be used in the same manner as an optical fiber for input. Therefore, there may be a plurality of optical fibers for input.

The description of the optical switch 100 will be continued further. An optical branching device 106 is connected to the optical fiber 101b for output. The optical branching device 106 splits and extracts a part of the output light from the optical fiber 101b for output, for example about 10% of a total intensity of the output light. The part of the extracted output light emitts from an end of an optical fiber 107 for monitoring upon being guided by the optical fiber 107 for monitoring. Light emitted is converted into parallel light by a collimating lens 108 for monitoring. Light from the collimating lens 108 for monitoring is diffracted at the grating 103. The grating 103 corresponds to the second spectroscope. Light diffracted is detected at a photodetector array 109.

Thus, the grating 103 serves functions of both the first spectroscope as well as the second spectroscope. By letting the first spectroscope and the second spectroscope to be the same, only one spectroscope serves the purpose. As a result of this, it is possible to reduce the size of a unit of the optical switch 100. It is needless to mention that the second spectroscope may also be prepared. When the first spectroscope and the second spectroscope are different or one and the same, in any of the cases, an effect achieved which is described later is the same.

As described before, the lights of wavelengths $\lambda_i$ and $\lambda_j$ are incident on the optical fiber 101b for output. Therefore, lights of a plurality of wavelengths are multiplexed in the optical fiber 101b for output. Certainly, the wavelengths are not restricted to $\lambda_i$ and $\lambda_j$. From among N number of lights of different wavelengths, which have emitted from the optical fiber 101a for input, lights of k number ($0 \leq k \leq N$) of wavelengths are reflected by k number of different mirrors in the mirror array 105 towards the optical fiber 101b for output. At this time, lights of k number of wavelengths are multiplexed in the optical fiber 101b for output.

Even when there is a plurality of optical fibers for input, from among lights of M number of wavelengths (M is let to be a total number of different wavelengths which have emitted from the plurality of optical fibers for input), lights of m number ($0 \leq m \leq M$) of wavelengths are reflected by m number of different mirrors in the mirror array 105 towards the optical fiber 101b for output. At this time, lights of m number of wavelengths are multiplexed in the optical fiber 101b for output.

Lights of a plurality of wavelengths are multiplexed even in the part of the output light which is extracted by the optical branching device 106 and guided by the optical fiber 107 for monitoring. Therefore, the light which passes through the collimating lens 108 for monitoring and diffracted at the grating 103 is separated at different angles according to the wavelength. The light of wavelength $\lambda_i$ is detected by an ith photodetector in a photodetector array 109. The light of wavelength $\lambda_j$ is detected by a jth photodetector in the photodetector array 109.

The ith photodetector in the photodetector array 109 detects the light of wavelength $\lambda_i$. The wavelength $\lambda_i$ corresponds to the detected wavelength. The light of wavelength $\lambda_i$ is reflected at the ith mirror in the mirror array 105. Therefore, it is seen that an angle of the ith mirror in the mirror array 105 is changed when there is a change in an output of the ith photodetector in the photodetector array 109. The change in the angle of the mirror may be due to an environmental change such as a change in temperature and humidity, and a change due to an elapsed time of long period. Even if there is a change in the temperature, humidity, and due to the elapsed time, it is important to know a change in a deflection angle of the mirror to realize a highly reliable optical switch.

An output (intensity of light) of the ith photodetector in the photodetector array 109 is fed back to the electric control circuit 110 and the angle of the ith mirror in the mirror array 105 is controlled by an electric signal. By this, it is possible to maintain the output of the ith photodetector in the photodetector array 109 to be constant over a long period of time. Light of wavelength $\lambda_i$ having a stabilized constant intensity can be output to the optical fiber 101b for output over a long period of time while maintaining an appropriate angle of the ith mirror in the mirror array 105 for a long period of time and without any effect of the environmental change or the change due to the elapsed time. Similarly, the light of wavelength $\lambda_j$ having a stabilized constant intensity can also be output over a long period of time. The wavelength is not restricted to $\lambda_i$ and $\lambda_j$, and the same is applicable to light of other wavelengths. The optical fiber for output is not restricted to 101b and may be other optical fiber for output.

The output (intensity of light) of the ith photodetector in the photodetector array 109 is fed back to the electric control circuit 110 and the angle of the ith mirror in the mirror array 105 is controlled by an electric signal. By this, it is possible to maintain the output of the ith photodetector in the photodetector array 109 to be the maximum over a long period of time. Light of wavelength $\lambda_i$ having the maximum intensity throughout can be output to the optical fiber 101b for output over a long period of time while maintaining an appropriate angle of the ith mirror in the mirror array 105 for a long period of time and without any effect of the environmental change or the change due to the elapsed time. Similarly, the light of wavelength $\lambda_j$ with the maximum intensity can be output over a long period of time. The wavelength is not restricted to $\lambda_i$ and $\lambda_j$, and the same is applicable to light of other wavelengths. The optical fiber for output is not restricted to 101b and may be other optical fiber for output.

While maintaining the output of the ith photodetector in the photodetector array 109, the maximum value of the output of the ith photodetector can be found by a so called mountain climbing control method. Moreover, while maintaining the output of the ith photodetector to a constant value it can be maintained constantly to be any value smaller than the maximum value. In this case, the optical switch 100 functions as an attenuator.

In this embodiment, as mentioned earlier, a part of the output light from the optical fiber 101b for output, for example about 10% of the total intensity of the output light, is split and extracted. Therefore, the intensity of light incident on the optical fiber 101b for output can be detected accurately. In this case, for example, a structure which monitors light of other order of diffraction that is not used in the optical switch from among the light diffracted by the grating 103 can be taken into consideration. However, in such structure, a diffraction efficiency of the grating is affected as a result of monitoring. Therefore it is difficult to detect accurately the intensity of light incident on the optical fiber 101b for output.

Second Embodiment

Figure 2:
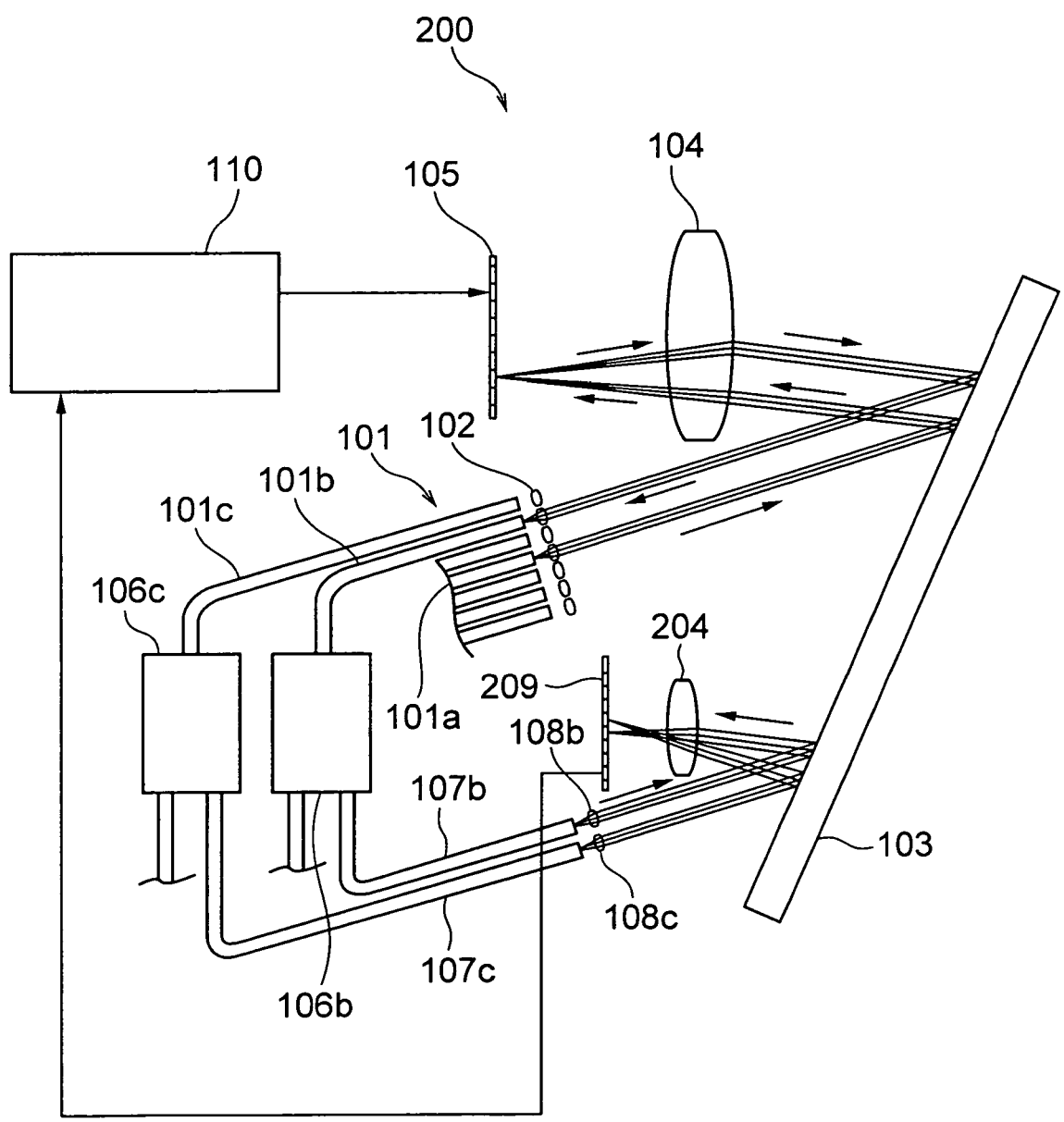
FIG. 2 is a diagram denoting a schematic structure of an optical switch according to a second embodiment.

FIG. 2 is a diagram denoting a schematic structure of an optical switch 200 according to a second embodiment of the present invention. Same reference numerals are used for components which are identical to the components in the first embodiment and the description is not repeated. In the second embodiment, two optical fibers 101b and 101c for output are provided. An optical branching device 106b is connected to the optical fiber 101b for output. An optical branching device 106c is connected to the optical fiber 101c for output. A part of the output light extracted by the optical branching device 106b and a 106c is guided to optical fibers 107b and 107c for monitoring respectively. Light emitted from the optical fibers 107b and 107c for monitoring is converted into parallel light at collimating lenses 108b and 108c for monitoring. Light emitted from the collimating lenses 108b and 108c for monitoring is diffracted at the grating 103. The diffracted light is formed as an image on a photodetector array 209 by a second image forming lens 204.

Lights of different wavelengths are diffracted at different angles at the grating 103. Therefore, the lights of different wavelengths form images on different photodetectors in a photodetector array 209 by the second image forming lens 204.

Irrespective of whether it is a light emitted from the optical fiber 107b for monitoring or whether it is a light emitted from the optical fiber 107c for monitoring, an image forming position is determined once the wavelength is determined. Therefore, the output light from a plurality of optical fibers such as the optical fibers 101b and 101c for monitoring can be detected by one photodetector array 209. As a result of this, it is possible to reduce the number of photodetector arrays.

Figure 5A:
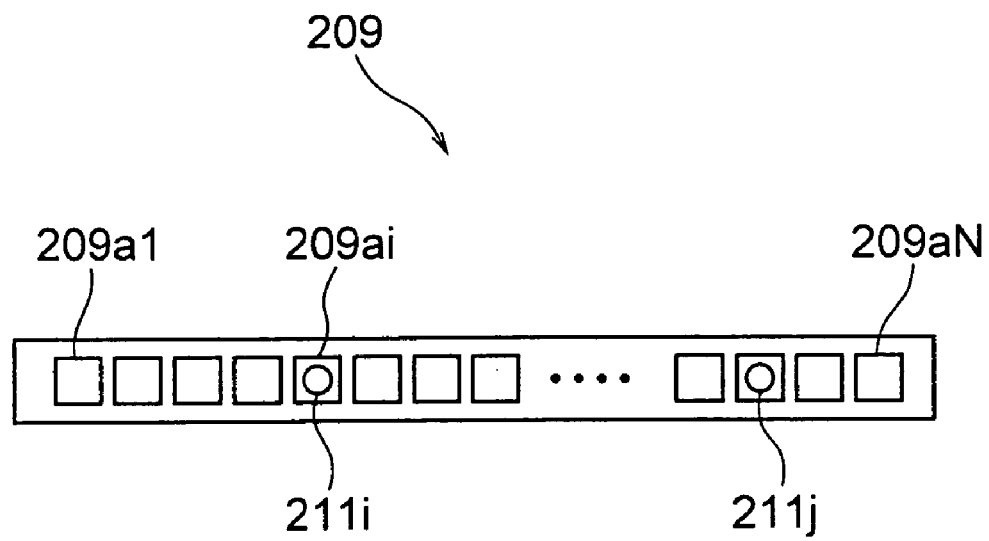
FIG. 5A is a diagram denoting a structure of an optical detector in the second embodiment.

FIG. 5A is a diagram denoting a schematic structure of the photodetector array 209. The photodetector array 209 includes a plurality of photodetectors 209a1, 209a2, ..., 209ai, ..., 209aN, which are arranged in a row. Light spots 211i and 211j are formed as images by the second image forming lens 204. Diameter of the light spots is small as the light spots are formed by the second image forming lens 204. As a result of this, a size of the photodetector array 209 can be reduced to a size smaller than a size of the photodetector array 109 in the first embodiment.

Similarly as in the first embodiment, the change in the angle of the ith mirror in the mirror array 105 can be determined by an output of the ith photodetector for example, in the photodetector array 209. Moreover, the output of the ith photodetector is fed back to the electric control circuit 110 and the angle of the ith mirror is controlled by the electric signal. As a result of this, it is possible to maintain the intensity of light of ith wavelength which is output to the optical fiber for output to be constant or the maximum.

Third Embodiment

Figure 3:
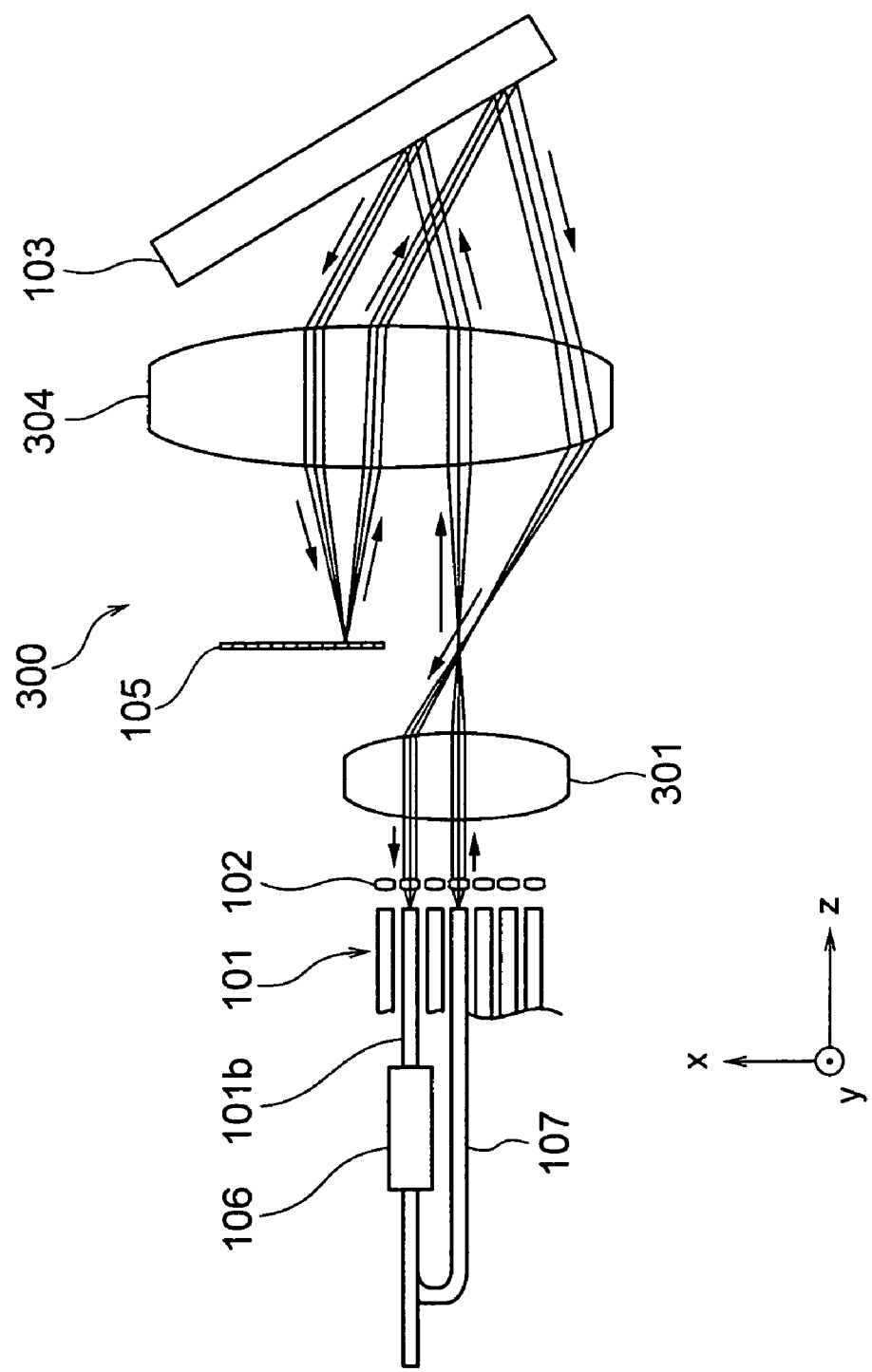
FIG. 3 is a diagram denoting a structure viewed from top of an optical switch according to a third embodiment.
Figure 5B:
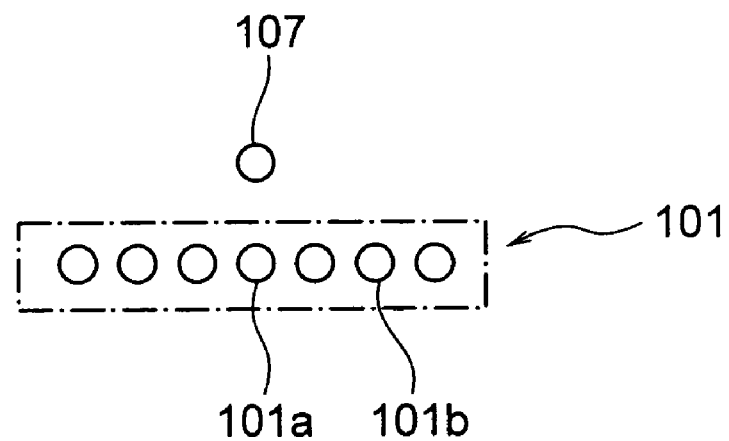
FIG. 5B is a diagram denoting an end face of an optical fiber in the third embodiment.

FIG. 3 and FIG. 4 denote a schematic structure of an optical switch 300 according to a third embodiment of the present invention. FIG. 3 is a structure viewed from top (xz plane) and FIG. 4 is a structure viewed from side (yz plane). FIG. 5B is a diagram denoting a structure of an end face of the optical fiber. Same reference numerals are used for components which are identical to the components in the first or the second embodiment and the description is not repeated.

A first image forming lens 304 also performs a function of the second image forming lens described in the second embodiment. A relay lens 301 is combined with the first image forming lens (=second image forming lens) 304 and forms a relay optical system. The relay optical system is disposed between a plurality of collimating lenses 102 and the grating 103. Thus, the third embodiment differs from the second embodiment at a point that the relay optical system which includes the relay lens 301 and the first image forming lens 304 is provided in an optical path between the plurality of collimating lenses 102 and the grating 103. The rest of the structure, i.e. a structure from a point where the light emitts from the optical fiber 101a for input till a point where the light is incident on the optical fiber 101b for output is similar to the structures in the first and the second embodiments.

By providing the relay optical system, it is possible to change a beam diameter of light that is incident on the grating 103. When an image is formed at the first image forming lens 304 upon increasing the beam diameter, a spot of the light formed as an image becomes smaller. As a result of this, it is possible to reduce the size of the mirrors in the mirror array 105. If the mirror array 105 is small, it is possible to use an MEMS (Micro Electro Mechanical System) in the mirror array 105. As a result of this, it is possible to reduce a size of a unit of the optical switch 300.

Light emitted from the optical fiber 107 for monitoring is detected by the photodetector array 209. Unlike as in the second embodiment, the second image forming lens also serves as the first image forming lens. As a result of this, by only one lens serving as the image forming lenses, it is possible to reduce the size of the unit of the optical switch 300.

The light emitted from the optical fiber 107 for monitoring is converted into parallel light at the collimating lens 108 for monitoring. Light from the collimating lens 108 for monitoring, passes through the relay optical system which includes the relay lens 301 and the first image forming lens 304. Light from the relay optical system is diffracted at the grating 103. Diffracted light is formed as an image on the photodetector array 209 at the first image forming lens 304.

Here, as shown in FIG. 5B, the optical fibers are disposed in a row near one optical fiber 107 for monitoring.

The description will be continued by returning to FIG. 4. An end face of the optical fiber 107 for monitoring and an end face of the optical fiber 101a for input are disposed such that the end faces are inclined. By this, an optical axis of light emitted from the optical fiber 107 for monitoring and an optical axis of light emitted from the optical fiber 101a for input are not parallel. The optical axes being not parallel, light from the optical fiber 101a for input which is formed as an image by the image forming lens 304 is formed as an image on the mirror array 105 and light from the optical fiber 107 for monitoring is formed as an image on the photodetector array 209. As a result of this, it is possible to dispose the photodetector array 209 and the mirror 105 without interfering spatially.

The light from the optical fiber 101a for input and the light from the optical fiber 107 for monitoring are formed as images on the same plane. Therefore the mirror array 105 and the photodetector array 209 can be disposed on the same plane. For example, the mirror array 105 and the photodetector array 209 can be disposed on the same plane in the same frame. As a result of this, adjustment during assembling becomes easier. Since the mirror array 105 and the photodetector array 209 are disposed on an image forming surface, in other words, on a surface in conjugation with a point light source, the size of the photodetector array 209 can be reduced.

Figure 6:
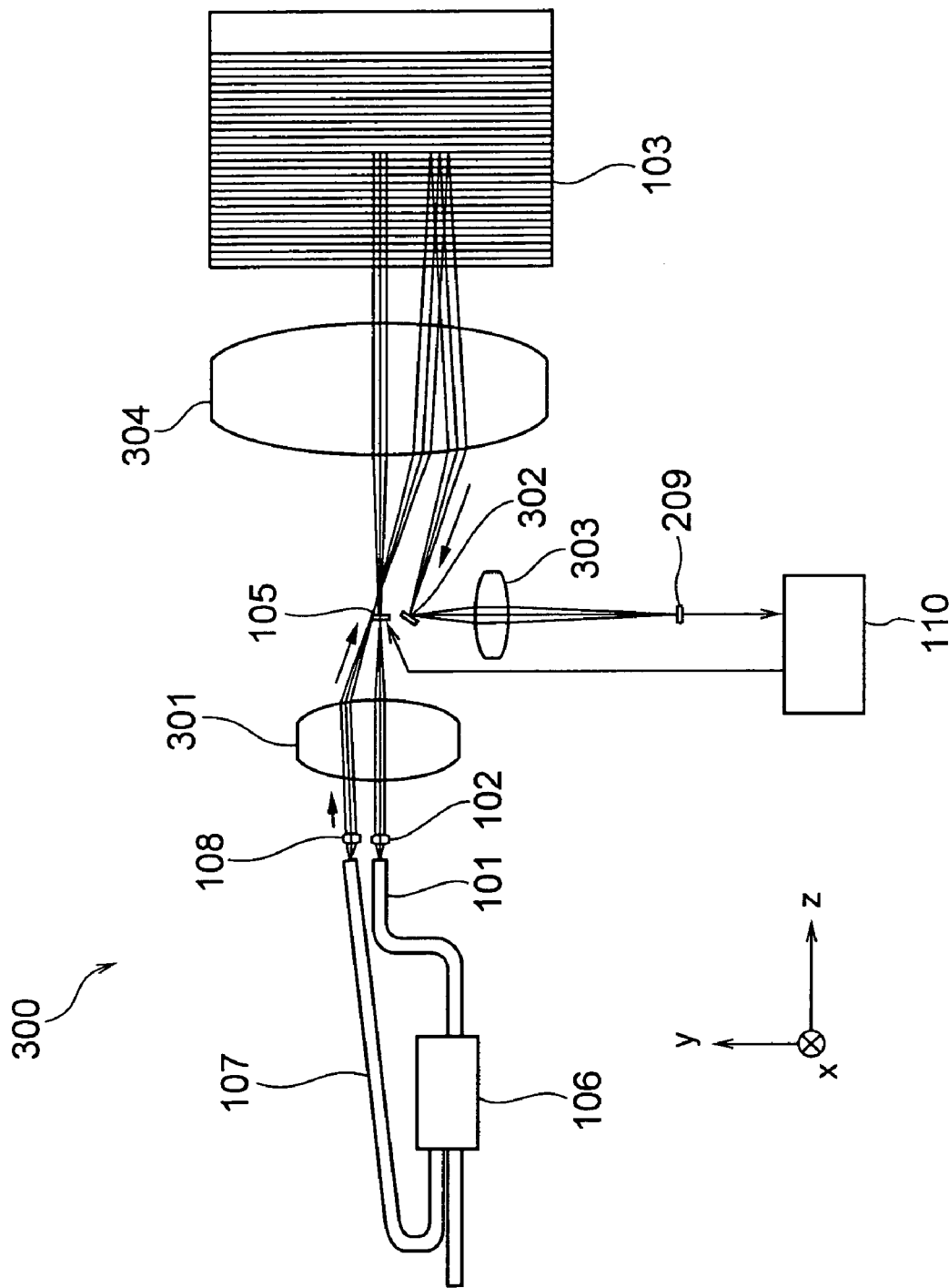
FIG. 6 is a diagram denoting another structure of the optical switch according to the third embodiment.

As shown in FIG. 6, the optical switch can be structured such that an optical path of light diffracted at the grating 103 is folded by causing the light to reflect at the mirror 302. Light reflected at the mirror 302 is again formed as an image on the photodetector array 209 by a lens 303. In this structure, the mirror array 105 and the photodetector array 209 can be separated spatially. As a result of this, positioning of peripheral equipment such as a control circuit and a drive circuit of the mirror array 105 and the photodetector array 209 becomes easier.

In the third embodiment, similar as in the first embodiment, it is possible to determine the change in the angle of the ith mirror in the mirror array 105 based on the output of the ith photodetector for example, in the photodetector array 209.

The output of the ith photodetector is fed back to the electric control circuit 110 and the angle of the ith mirror is controlled by the electric signal. By this, it is possible to maintain the intensity of the light of ith wavelength which is output from the optical fiber for output to be constant or the maximum.

Modified Example of Third Example

Figure 7:
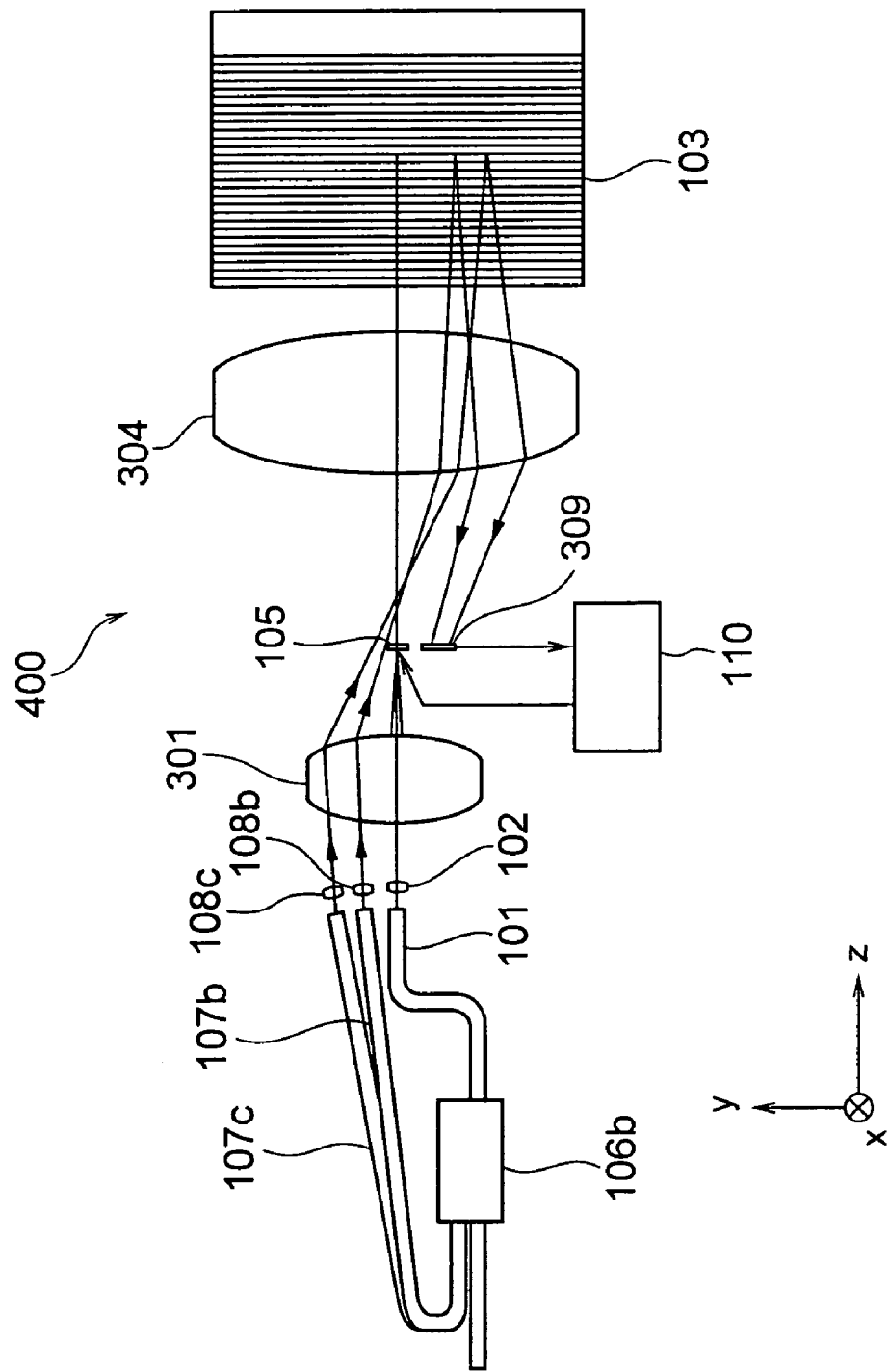
FIG. 7 is a diagram denoting a side surface structure of an optical switch in a modified example of the third embodiment.

FIG. 7 denotes a structure viewed from a side of an optical switch 400 according to a modified example of the third embodiment. Similarly as in the second embodiment, a part of the output light from the two optical fibers for output is guided to the two optical fibers 107b and 107c for monitoring. To facilitate the understanding, only a beam on an optical axis is shown in FIG. 7 and other beams are not shown. Lights emitted from the optical fibers 107b and 107c for monitoring are converted into parallel lights at the collimating lenses 108b and 108c for monitoring. The converted parallel lights pass through the relay optical system which includes the relay lens 301 and the first image forming lens 304. Lights from the relay optical system are diffracted at the grating 103. Diffracted lights are formed as an image on a photodetector array 309 at the first image forming lens 304.

Figure 8A:
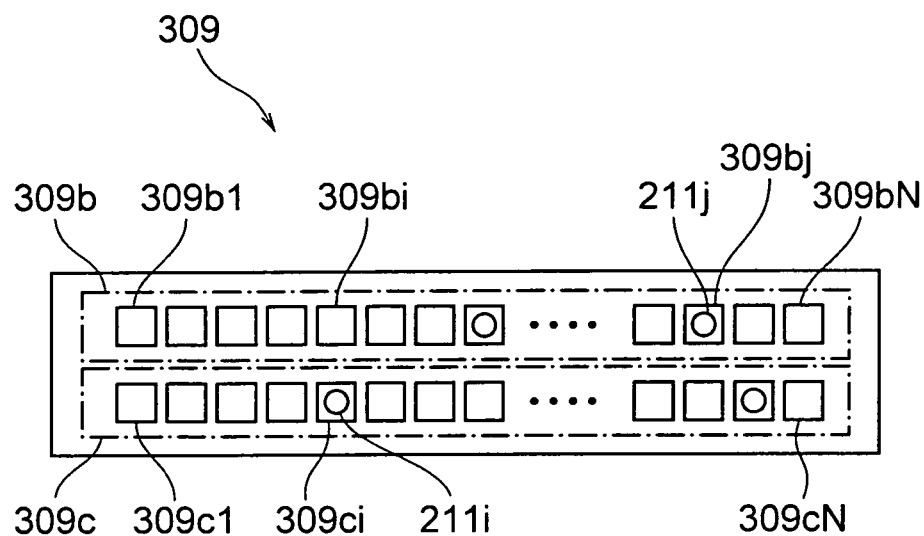
FIG. 8A is a diagram denoting a structure of a photodetector in the modified example of the third embodiment.

FIG. 8A denotes a structure of the photodetector array 309. The photodetector array 309 includes two rows of photodetector arrays 309b and 309c. Light emitted from the optical fiber 107b for monitoring is separated spatially according to a wavelength by the grating 103. The light is formed as an image in photodetectors 309b1, ..., 309bi, ..., 309bN which correspond to wavelengths included in the light from the optical fiber 107b for monitoring. Similarly, light emitted from the optical fiber 107c for monitoring is separated spatially according to a wavelength at the grating 103. The light is formed as an image in photodetectors 309c1, ..., 309ci, ..., 309cN which correspond to wavelengths included in the light from the optical fiber 107c for monitoring.

In the modified example of the third embodiment, light from the optical fiber 101a is formed as an image on the mirror array 105. Moreover, light from the optical fiber 107b is formed as an image on the photodetector array 309b. Furthermore, light from the optical fiber 107c is formed as an image on the photodetector array 309c. Thus, the lights emitted from the optical fibers 101a, 107b, and 107c are formed as the images at different positions. The reason for this being that end faces of respective optical fibers are inclined and optical axes of the lights emitted from the optical fibers 101a, 107b, and 107c are not parallel. The lights emitted from the optical fibers 101a, 107b, and 107c are inclined in direction which differs by 90° from a direction in which the light is separated according to the wavelength at the grating 103. In other words, the optical axes of the light emitted from the optical fibers 101a, 107b, and 107c are inclined such that the optical axes are not parallel to a direction (direction in yz plane) which is roughly orthogonal to a direction (direction in xz plane) in which the light is diffracted by the grating 103. As a result of this, the mirror array 105 and the photodetector array 309b, and the photodetector array 309c do not interfere spatially with each other.

The light spot 211i having ith wavelength is a light which has emitted from the optical fiber 107c for monitoring. As shown in FIG. 8A, the light spot 211i is formed as an image on the ith photodetector 309ci in the photodetector array 309c. Moreover, the light spot 211j having jth wavelength is a light which has emitted from the optical fiber 107b for monitoring. The light spot 211j is formed as an image on jth photodetector 309bj in the photodetector array 309b.

A change in the angle of the ith mirror in the mirror array 105, particularly the change in the angle when the light is reflected towards the optical fiber 101c for output can be determined by an output of the ith photodetector 309ci in the photodetector array 309c. Similarly, a change in the angle of the jth mirror, particularly the change in the angle when the light is reflected towards the optical fiber 101b for output can be determined by an output of the jth photodetector in the photodetector array 309b. By this, the change in the angle of the mirror for each optical fiber for output can be determined. Therefore, it is possible to allow the light to be incident accurately on a desired optical fiber for output. As a result, it is possible to reduce the cross talk.

Moreover, the output of the ith photodetector 309ci in the photodetector array 309c is fed back to the electric control circuit 110 and the angle of the ith mirror is controlled by the electric signal. By this, it is possible to maintain the intensity of light of ith wavelength which is output to the optical fiber 101c for output to be constant or the maximum. The output of the jth photodetector 309bj in the photodetector array 309b is fed back to the electric control circuit 110 and the angle of the jth mirror is controlled by the electric signal. By this, it is possible to maintain the intensity of light of jth wavelength which is output to the optical fiber 101b for output to be constant or the maximum. Thus, for each optical fiber for output, it is possible to maintain the intensity of the light output to be constant or the maximum by carrying out the electric control of the angle of the mirror. In the modified example of the third embodiment, the angle of the mirror can be controlled for each of the plurality of optical fibers for output by using a plurality of photodetector arrays. There need not be necessarily two optical fibers for output and there may be more than two optical fibers.

Fourth Embodiment

Figure 8B:
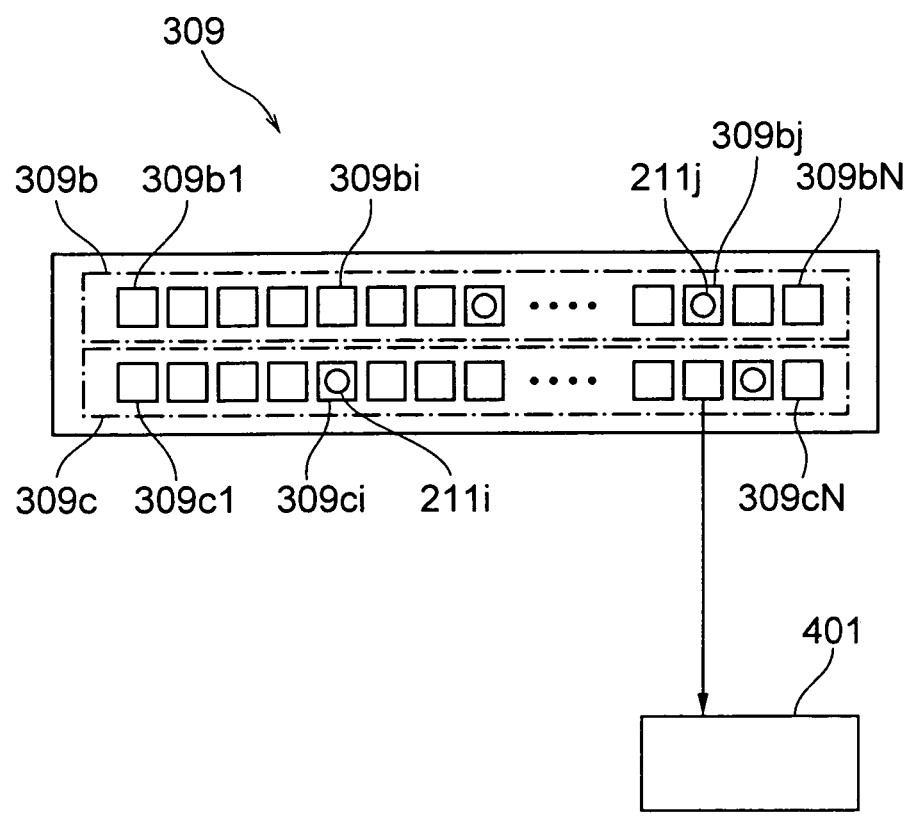
FIG. 8B is a diagram denoting a structure near a photodetector in a fourth embodiment.

FIG. 8B denotes a structure near the photodetector of an optical switch according to a fourth embodiment of the present invention. In the fourth embodiment, in addition to the structure in the modified example of the third embodiment, the output of the photodetector 309 is connected to a demodulator circuit 401 as shown in FIG. 8B. The demodulator circuit 401 demodulates an optical signal detected at the photodetector 309, to an electric signal. The change in the angle of the mirror can be detected with high sensitivity by detecting a degradation of the demodulated electric signal such as a decrease in an S/N ratio and an increase in an error rate of a communication signal. The demodulation circuit for demodulation may be provided in the plurality of photodetectors.

Moreover, in each embodiment of the present invention, the optical switch can be structured such that a collimating lens is disposed in the optical fiber for input and in the optical fiber for output respectively. Moreover, the optical switch can be structured such that one collimating lens is disposed to correspond with the optical fiber for input and the optical fiber for output.

Thus, the optical switch according to the present invention can also be used as an attenuator. In this way, the present invention is to be construed as embodying all modifications and alternative constructions which fairly fall within the basic teachings herein set forth.

Thus, the optical switch according to the present invention is appropriate for outputting (switching) accurately to the optical fiber for output.

What is claimed is:

1. An optical switch comprising:
    an optical fiber for output;
    an optical fiber for input;
    a plurality of collimating lenses which are disposed corresponding to the optical fiber for output and the optical fiber for input respectively;
    a spectroscope which separates spatially light from the collimating lens according to a wavelength;
    a image forming lens which forms an image of light from the spectroscope;
    a mirror array which includes a plurality of mirrors which reflect light formed as an image by the image forming lens, and an angle of each mirror can be controlled independently by an electric signal;
    an optical branching device which is connected to the optical fiber for output and extracts a part of output light from the optical fiber for output;
    an optical fiber for monitoring which guides the part of the output light extracted by the optical branching device;
    a collimating lens for monitoring which is disposed corresponding to the optical fiber for monitoring; and
    a photodetector array which can detect each of lights of different wavelengths from the collimating lens for monitoring, which are separated at the spectroscope and which are imaged by the image forming lens, the collimating lens for monitoring being disposed in an optical path between the optical fiber for monitoring and the photodetector array.

2. The optical switch according to claim 1, wherein an end face of the optical fiber for monitoring and an end face of the optical fiber for input are inclined with respect to each other so that an optical axis of light emitted towards the spectroscope from the optical fiber for monitoring and an optical axis of light emitted towards the spectroscope from the optical fiber for input are not parallel.

3. The optical switch according to claim 2, wherein the mirror array and the photodetector array are disposed on the same plane which are an image forming surface of the image forming lens.

4. The optical switch according to claim 2, further comprising: an electric control circuit which controls the angle of the mirror which reflects the light of the detected wavelength such that an intensity of light of wavelength detected by at least one photodetector in the photodetector array becomes constant.

5. The optical switch according to claim 2, further comprising: an electric control circuit which controls the angle of the mirror which reflects the light of the detected wavelength such that an intensity of light of wavelength detected by at least one photodetector in the photodetector array becomes maximum.

6. The optical switch according to claim 2, further comprising: a demodulation circuit which demodulates an optical signal detected by at least one photodetector in the photodetector array, to an electric signal.

7. The optical switch according to claim 2, wherein:
    the optical fiber for output is constructed as a row of a plurality of optical fibers;
    the optical branching devices are connected to each of the optical fibers;
    the optical fibers for monitoring are connected to the optical branching devices; and
    optical axes of the lights emitted from the optical fibers for output and from the optical fibers for monitoring are not parallel.

* * * * *